United States Patent [19]
Dykstra

[11] Patent Number: 6,040,767
[45] Date of Patent: *Mar. 21, 2000

[54] CONTROL SYSTEM FOR ENGINE LUBRICANT LEVEL SENSOR

[75] Inventor: Richard A. Dykstra, Cedar Grove, Wis.

[73] Assignee: Briggs & Stratton Corporation, Wauwatosa, Wis.

[*] Notice: This patent issued on a continued prosecution application filed under 37 CFR 1.53(d), and is subject to the twenty year patent term provisions of 35 U.S.C. 154(a)(2).

[21] Appl. No.: 08/878,790

[22] Filed: Jun. 19, 1997

[51] Int. Cl.$^7$ .................................................. B60Q 1/00
[52] U.S. Cl. .................... 340/450.3; 340/450; 340/450.2
[58] Field of Search ................... 340/450, 450.2, 340/450.3, 618, 623

[56] References Cited

U.S. PATENT DOCUMENTS

| | | | |
|---|---|---|---|
| 2,714,715 | 8/1955 | Manier | 340/244 |
| 3,002,186 | 9/1961 | Schlangen | 340/244 |
| 3,204,230 | 8/1965 | Hosford, Jr. | 340/244 |
| 3,588,404 | 6/1971 | Akeley | 200/84 |
| 3,636,509 | 1/1972 | Breece et al. | 340/620 |
| 3,750,124 | 7/1973 | Barnes et al. | 340/244 E |
| 3,872,429 | 3/1975 | Arney | 340/59 |
| 3,886,517 | 5/1975 | Ohtake et al. | 340/52 F |
| 3,934,103 | 1/1976 | Walstra | 200/84 C |
| 3,938,117 | 2/1976 | Bozoian | 340/244 R |
| 3,939,470 | 2/1976 | Arai et al. | 340/59 |
| 3,953,845 | 4/1976 | Kress | 340/244 B |
| 3,978,299 | 8/1976 | Takai | 200/84 C |
| 3,997,744 | 12/1976 | Higo | 200/84 C |
| 4,034,608 | 7/1977 | Vincent | 73/313 |
| 4,081,639 | 3/1978 | Tice | 200/84 C |
| 4,335,285 | 6/1982 | West | 200/84 C |
| 4,385,290 | 5/1983 | Fiala | 340/620 |
| 4,386,337 | 5/1983 | Todd | 340/59 |
| 4,491,103 | 1/1985 | Deadman | 123/196 S |
| 4,503,419 | 3/1985 | Kidd et al. | 340/622 |
| 4,539,547 | 9/1985 | Nagy, Jr., et al. | 340/59 |
| 4,572,097 | 2/1986 | Chapelsky | 116/227 |
| 4,584,554 | 4/1986 | Weiss | 340/59 |
| 4,600,820 | 7/1986 | Bruder et al. | 200/84 C |
| 4,609,796 | 9/1986 | Bergsma | 200/84 C |
| 4,644,117 | 2/1987 | Grimes et al. | 200/84 R |
| 4,665,370 | 5/1987 | Holland | 340/636 |
| 4,684,917 | 8/1987 | Tharman | 340/59 |
| 4,721,941 | 1/1988 | Robine, Jr. et al. | 340/59 |
| 4,760,736 | 8/1988 | Huynh | 73/430 |
| 4,796,473 | 1/1989 | Custer | 73/308 |
| 4,838,082 | 6/1989 | McCoy et al. | 73/313 |
| 4,848,151 | 7/1989 | Bruder et al. | 73/308 |
| 4,910,495 | 3/1990 | Sullivan | 340/450 |
| 4,981,039 | 1/1991 | Hayashi et al. | 73/292 |
| 5,027,656 | 7/1991 | Garrison | 73/313 |
| 5,035,512 | 7/1991 | Tateishi et al. | 374/142 |
| 5,042,300 | 8/1991 | Benjey et al. | 73/308 |
| 5,097,703 | 3/1992 | Peter | 73/304 C |
| 5,107,248 | 4/1992 | Koiwa et al. | 340/451 |
| 5,124,686 | 6/1992 | White et al. | 340/624 |
| 5,196,824 | 3/1993 | Helm | 340/450.3 |
| 5,294,917 | 3/1994 | Wilkins | 340/625 |
| 5,298,881 | 3/1994 | Bowman | 340/450.3 |
| 5,299,456 | 4/1994 | Steiner | 73/308 |
| 5,410,913 | 5/1995 | Blackburn | 73/313 |
| 5,483,109 | 1/1996 | Gholston | 307/118 |
| 5,493,086 | 2/1996 | Murphy, Jr. et al. | 200/84 R |

FOREIGN PATENT DOCUMENTS 7-317525  5/1995  Japan ............................. F01M 11/12

*Primary Examiner*—Edward Lefkowitz
*Attorney, Agent, or Firm*—Michael Best & Friedrich LLP

[57] ABSTRACT

A control system for an engine low oil sensor prevents engine starting if the oil level is below a predetermined level, but thereafter enables the engine to run uninterrupted even if the oil level becomes low during engine operation. After the engine is shut off for any reason, the control system resets so that the low oil switch is operable during the next attempted restart of the engine. The control system also includes a visual or audible indicator that indicates when engine starting is prevented due to a low oil condition.

17 Claims, 1 Drawing Sheet

CONTROL SYSTEM FOR ENGINE LUBRICANT LEVEL SENSOR

BACKGROUND OF THE INVENTION

This invention relates to internal combustion engines. More particularly, this invention relates to engine lubricant level sensors, such as low oil sensors.

Several types of lubricant level sensors are known. In a float-type sensor, a contact is attached to a float which rides on the surface of the lubricant reservoir or crankcase. When the lubricant level sufficiently drops, electrical contact is made between the contact on the float and ground, so that ignition pulses are shorted to ground and the engine is stopped.

There are several problems with such float-type low oil sensors. For example, these sensors may give false readings when a splash-type lubrication system is used in a small internal combustion engine. In a splash-type lubrication system, a slinger gear or paddle splashes lubricant throughout the engine housing while the engine is running. Shortly after the engine has started, much of the lubricating fluid has been splashed throughout the engine housing, so that the actual level in the lubricant reservoir is very low, even though the overall engine lubrication level is satisfactory. As a result, the float switch may be erroneously closed even though the amount of lubricant in the engine is sufficient. To avoid such false readings, it is known to use a timer circuit to delay the indication of a low oil condition for a preset period of time after engine starting. After the time delay period has passed, the lubricant level sensor operates in a normal manner.

Another problem with low lubricant sensors is that the low lubricant level switch tends to oscillate or bounce when the lubricant level in the crankcase is fluctuating. Such fluctuations may occur during normal engine operation, particularly in splash-type lubrication systems, since the amount of lubricant actually in the crankcase is not necessarily a correct indication of the amount of lubricant in the engine. The switch may also oscillate or bounce if the engine is being tilted, which occurs, for example, when the engine is applied to a lawnmower that is moving over an uneven terrain. As a result, the engine may misfire since some of ignition pulses are being grounded and others are not. To overcome this problem, it is known to impose a delay period after the low lubricant level switch closes before an indication is provided of a low lubricant level condition. For example, see U.S. Pat. No. 3,886,517 issued May 27, 1995 to O. H. Taken et al. and U.S. Pat. No. 4,838,082 issued Jun. 13, 1989 to McCoy et al.

A significant disadvantage of these time delay approaches is that they typically require relatively complicated and expensive circuitry, which may not be feasible for a lower cost internal combustion engine.

SUMMARY OF THE INVENTION

A control system is disclosed for use with an engine lubrication level sensor, such as a float-type sensor. The control system is particularly suitable for use with small internal combustion engines having a splash-type lubrication system.

In a preferred embodiment, the control system includes a means for sensing that the engine has a low lubricant level during engine starting, the sensing means including a switch, preferably a float-type switch, of a low lubricant level sensor. The control system also includes means for preventing the engine from starting if the sensing means senses a low lubricant level during engine starting, the preventing means including a circuit having a first semiconductor switch, such as a transistor, a thyristor, silicon controlled rectifier (SCR) or a triac.

A unique feature of the control system is that the control system includes a means for disabling the start preventing means after the engine has started during substantially all of the remaining time that the engine is operated before the engine is shut off. The disable means preferably includes a capacitor that is charged by an ignition winding, and a second semiconductor switch having a control input that is connected in circuit with the capacitor. During normal engine operation, the charged capacitor keeps the second semiconductor switch ON. The second semiconductor switch is connected in circuit to the control input of the first semiconductor switch, so that when the second semiconductor switch is ON, there is insufficient control voltage to switch ON the first semiconductor switch. As a result, the low oil sensor is disabled after the engine has started during the remaining period that the engine is operating.

The control system also includes a means for resetting the disabling means after the engine has been shut off for any reason, so that the engine can be successfully restarted, if, for example, additional lubricant has been added to the engine crankcase after shutoff. A preferred embodiment also includes an indicator that outputs either a visual or an audible signal to tell the operator that the engine cannot be started due to an inadequate level of lubricant during engine starting.

It is a feature and advantage of the present invention to sense the lubricant level in an engine during the first several revolutions of the engine at starting, and thereafter preventing the engine from being shut down during normal engine operation due to a low lubricant level.

It is yet another feature and advantage of the present invention to provide an inexpensive control system that may be used with an off-the-shelf engine lubricant level sensor.

DETAILED DESCRIPTION OF THE INVENTION

Figure 1:
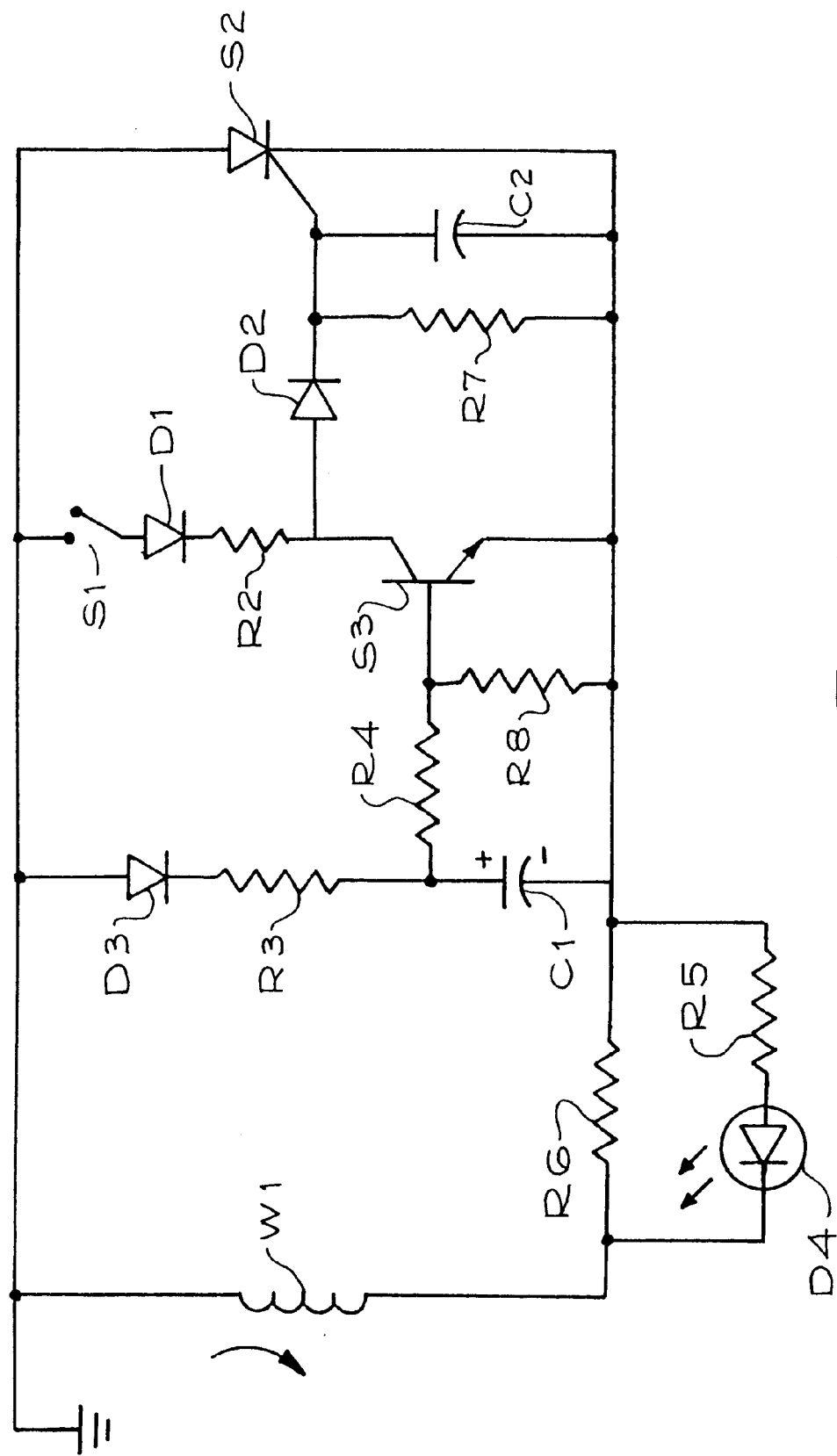
FIG. 1 is a schematic diagram of the preferred embodiment of the invention.

The control system according to the present invention is particularly suitable for low cost, small internal combustion engines having a relatively small fuel tank, where the engine can only be run for a few hours before it is shut down for refueling, or where the engine is stopped periodically for any other reason. In each such case where the control system is used, it is assumed that the engine will run out of fuel before it runs out of lubricating fluid, since the lubricating fluid level was adequate for the engine to start in the first instance. The control system according to the present invention may also be used to prevent damage when the operator attempts to start a brand new engine without first adding lubricating fluid.

The control system according to the present invention is much simpler, less expensive and more reliable than any prior art control system which incorporates starting circuitry as well as a time delay, running-reset and latching features to compensate for the switch bounce and fluctuating lubricant fluid levels that occur in engines, particularly when a heavy engine load is applied.

The control system of the present invention is preferably used with a float-type lubricant level switch, and senses switch position during the first several flywheel rotations during engine starting. If an adequate lubricant level is present, the engine will start and the engine start prevention circuitry will be quickly disabled. If the engine lubricant level is low at the time of engine starting, the engine's ignition coil primary winding voltage will be shunted to ground and the engine will not start.

If the lubricating fluid level is sufficient at engine starting, the engine will start and the start prevention circuit, which shuts down the engine during engine starting if a low lubricant level is sensed, is disabled. If the engine then runs out of fuel, the engine shuts off and the sensing circuitry of the start prevention circuit is reset. The level of the lubricating fluid is rechecked during engine starting, and the engine will not start if the lubricating fluid level is now below a predetermined level.

FIG. 1 is a schematic diagram of a preferred embodiment of the invention. In FIG. 1, switch S1 is preferably a switch in a low lubricant level sensor, preferably of the float-type. One suitable low level sensor is made by Mitsubishi of Nagoya, Japan, Part No. KF09021AA. The Mitsubishi float-type sensor is described in Japanese Patent Application No. 7-317525 published Dec. 5, 1995. As with typical float-type low oil sensors, the Mitsubishi sensor includes a float having a metal contact attached thereto, to which is attached a wire connected in circuit to an engine's ignition primary winding. When the level of a lubricating fluid is below an acceptable level, the float contact becomes electrically connected to ground, thereby shunting the ignition primary winding signals and stopping the engine.

In the present invention and referring again to FIG. 1, when switch S1 is closed during the initial engine starting, SCR S2 is switched ON by a signal from ignition primary winding W1 through closed switch S1, diode D1, resistor R2 and diode D2. Resistor R7 and capacitor C2 act as a filter to prevent transient voltages from switching ON SCR S2.

If the engine begins running, capacitor C1 is charged by the signal from winding W1 through diode D3 and resistor R3. The capacitor voltage turns ON semiconductor switch S3 through a resistor R4. Switch S3 is preferably a darlington transistor, although other types of switches may be used.

When switch S3 is turned ON while the engine is running, the voltage otherwise present at the gate of SCR S2 is shunted to ground through switch S3, thereby preventing the SCR gate from reaching a sufficient voltage to turn ON SCR S2. As a result, the engine is not shut down due to a low lubricant fluid condition, even if switch S1 is closed.

On the other hand, if switch S1 is closed during the initial engine starting, indicating that a low lubricant level condition exists, switch S3 remains OFF since capacitor C1 is not fully charged, and SCR switch S2 is gated ON. As a result, ignition pulses from primary winding W1 are shunted to ground and the engine will not start.

Resistor R8 may be used to select the engine speed, between an engine starting speed and an engine running speed, at which switch S3 is turned ON. As a result, resistor R8 may be used to select the engine speed above which the engine will not be shut down due to a low lubricant level. Reducing the value of resistor R8 increases the engine speed at which the disable means disables the start preventing circuit. Reducing the value of resistor R8 tends to reduce the effects of the bouncing of switch S1.

When the engine fails to start due to a low lubricant level, a light emitting diode (LED) D4 emits a visual indication that the engine is failing to start due to a low lubricant level condition. Resistor R5 protects diode D4 by limiting the current therethrough. Resistor R6 is a low value resistor to generate a voltage across the diode.

Although a LED is disclosed as providing a visual indication that the engine will not start due to a low lubricant level, it is apparent that another type of light could be used, or that an audible alarm or buzzer may be used instead.

Although switch S2 is disclosed as being a silicon controlled rectifier, it is apparent that other types of thyristors, such as a triac, could be used.

After the engine has been shut down for any reason, the control system resets since the voltage from capacitor C1 is no longer present to keep switch S3 gated ON. During a subsequent restart attempt of the engine, engine starting will be prevented if low lubricant level switch S1 is closed.

While a preferred embodiment of the present invention has been shown and described, alternate embodiments will be apparent to those skilled in the art and are within the intended scope of the present invention. Therefore, the invention has to be limited only by the following claims.

I claim:

1. A control system used with an engine lubricant level sensor, comprising:

a switch that closes when the engine has a low lubricant level during engine starting;

a start prevention circuit that prevents starting of the engine if said switch is closed during an attempted engine starting;

a disabler that disables said start prevention circuit only after engine starting during substantially all of the remaining time that the engine is operated before the engine is shut off; and a winding that provides power to said disabler;

whereby the disabling means prevents the shutting down of the engine due to a low lubricant level after the engine has started.

2. The control system of claim 1, further comprising:

a reset that resets said disabler after engine has been shut off.

3. The control system of claim 1, wherein said switch includes a float type switch.

4. The control system of claim 1, wherein said start prevention circuit includes:

at least one of a transistor, thyristor, silicon controlled rectifier and a triac, connected in circuit between an engine ignition winding and ground.

5. The control system of claim 1, wherein said disabler includes:

a capacitor that is charged by said winding; and a semiconductor switch having a control input that is connected in circuit with said capacitor.

6. The control system of claim 1, further comprising:

an indicator that provides at least one of a visual and an audible signal if engine starting has been prevented by said start prevention circuit.

7. The control system of claim 1, wherein said winding includes an engine ignition winding.

8. A control system used with an engine lubrication sensor, comprising:

means for sensing that the engine has a low lubricant level during engine starting;

means for preventing starting of the engine if said sensing means senses a low lubricant level during an attempted engine starting;

means for disabling said start preventing means after the engine has started during substantially all of the time that the engine is operated before the engine is shut off; and a winding that provides power to said disabler;

whereby the disabling means prevents the shutting down of the engine due to a low lubricant level only after the engine has started.

9. The control system of claim 8, further comprising:

means for resetting said disabling means after the engine has been shut off.

10. The control system of claim 8, wherein said sensing means includes a float type switch.

11. The control system of claim 8, wherein said start preventing means includes:

at least one of a transistor, thyristor, a silicon controlled rectifier and a triac, connected in circuit between an engine ignition winding and ground.

12. The control system of claim 8, wherein said disable means includes:

a capacitor that is charged by said winding; and a semiconductor switch having a control input that is connected in circuit with said capacitor.

13. The control system of claim 12, further comprising:

an indicator that outputs at least one of a visual and an audible signal if engine starting has been prevented by said start preventing means.

14. The control system of claim 8, wherein said winding includes an engine ignition winding.

15. A method of controlling engine operation, said engine having a low lubricant sensor, comprising:

sensing, during starting of the engine, that the engine has a low lubricant level;

preventing starting of the engine if a low lubricant level is sensed during engine starting; preventing the shutting down of the engine, using a disabler, due to a low lubricant level only after the engine has started; and providing power to the disabler using a winding.

16. The method of claim 15, further comprising:

resetting the disabler after the engine has been shut off to enable an engine restart to be attempted.

17. The method of claim 15, further comprising:

providing at least one of a visual and an audible indication that engine starting has been prevented due to a low lubricant level.

* * * * *